US009449055B1

(12) United States Patent
Nijjar

(10) Patent No.: US 9,449,055 B1
(45) Date of Patent: Sep. 20, 2016

(54) TECHNIQUE FOR ESTIMATING REPORT GENERATION TIME AT LAUNCH IN CLIENT-SERVER APPLICATIONS

(75) Inventor: Manjinder Singh Nijjar, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 1351 days.

(21) Appl. No.: 12/131,673

(22) Filed: Jun. 2, 2008

(51) Int. Cl.
G06F 7/00 (2006.01)
G06F 17/30 (2006.01)

(52) U.S. Cl.
CPC .............. *G06F 17/30536* (2013.01)

(58) Field of Classification Search
CPC ............ G06F 17/211; G06F 17/3005; G06F 17/30536; G06Q 99/00
USPC .............. 707/705, 713, 758, 719, 101, 102, 707/999.003; 715/500, 515; 705/7.36
See application file for complete search history.

(56) References Cited

U.S. PATENT DOCUMENTS

| 5,826,104 | A * | 10/1998 | Rifkin | 710/15 |
| 5,978,832 | A * | 11/1999 | Sirkin | 718/107 |
| 6,279,033 | B1 * | 8/2001 | Selvarajan et al. | 709/217 |
| 6,912,533 | B1 * | 6/2005 | Hornick | 707/700 |
| 7,133,834 | B1 * | 11/2006 | Abelow | 705/7.32 |
| 7,363,581 | B2 * | 4/2008 | Parks et al. | 715/235 |
| 2003/0163478 | A1 * | 8/2003 | Kirkland | 707/102 |
| 2005/0039119 | A1 * | 2/2005 | Parks et al. | 715/515 |
| 2006/0020895 | A1 * | 1/2006 | Keohane et al. | 715/732 |
| 2006/0048042 | A1 * | 3/2006 | Sembower et al. | 715/500 |
| 2006/0247938 | A1 * | 11/2006 | Thieret | 705/1 |
| 2007/0058197 | A1 * | 3/2007 | Miyamoto | 358/1.15 |
| 2007/0083564 | A1 * | 4/2007 | Ramacher et al. | 707/200 |
| 2007/0189827 | A1 * | 8/2007 | Lermant et al. | 400/76 |
| 2007/0283032 | A1 * | 12/2007 | Kim et al. | 709/230 |
| 2008/0043289 | A1 * | 2/2008 | Cranitch et al. | 358/402 |
| 2008/0082494 | A1 * | 4/2008 | Polo-Malouvier et al. | 707/3 |
| 2008/0278745 | A1 * | 11/2008 | Morales et al. | 358/1.15 |

OTHER PUBLICATIONS

National Instruments, LabVIEW Report Generation Toolkit for Microsoft Office, Jan. 2007.*
Vista Calculating Estimated Time (Hours and Minutes or Seconds) Remaining. My Digital Life. Sep. 8, 2007. Windows Vista. http://www.mydigitallife.info/2007/09/08/vista-calcuting-estimated-time-hours-and-minutes-or-seconds-remaining/.
National Instruments Corporation, "Report Generation Explained," Jul. 7, 2014, pp. 1-7.

\* cited by examiner

*Primary Examiner* — James Trujillo
*Assistant Examiner* — John J Morris
(74) *Attorney, Agent, or Firm* — Campbell Stephenson LLP

(57) ABSTRACT

A method, system and computer program product for estimating report generation time are disclosed. The method includes receiving an indication that a user is requesting a report from a database application. An estimated amount of time for the database application to generate the report is calculated, and the estimated amount of time is displayed to the user.

23 Claims, 7 Drawing Sheets

TECHNIQUE FOR ESTIMATING REPORT GENERATION TIME AT LAUNCH IN CLIENT-SERVER APPLICATIONS

BACKGROUND OF THE INVENTION

1. Field of the Invention

This invention relates to data reporting systems and, more particularly, to creating reports of data in applications.

2. Description of the Related Art

The increasing size and complexity of databases supported by database applications has also increased the complexity of the reports requested by users. Further, as the database use has proliferated, the number of users interacting with a database server at any one time has tended to increase. Increases in report complexity, database complexity, and database utilization have, in turn, increased the time needed to generate reports. Report generation time is becoming a significant unpredictable drag on the productivity of database users.

SUMMARY OF THE INVENTION

A method, system and computer program product for estimating report generation time are disclosed. The method includes receiving an indication that a user is requesting a report from a database application. An estimated amount of time for the database application to generate the report is calculated, and the estimated amount of time is displayed to the user.

BRIEF DESCRIPTION OF THE DRAWINGS

A more complete understanding of the present method, system and computer program product for estimating report generation time may be acquired by referring to the following description and the accompanying drawings, in which like reference numbers indicate like features.

Figure 1:
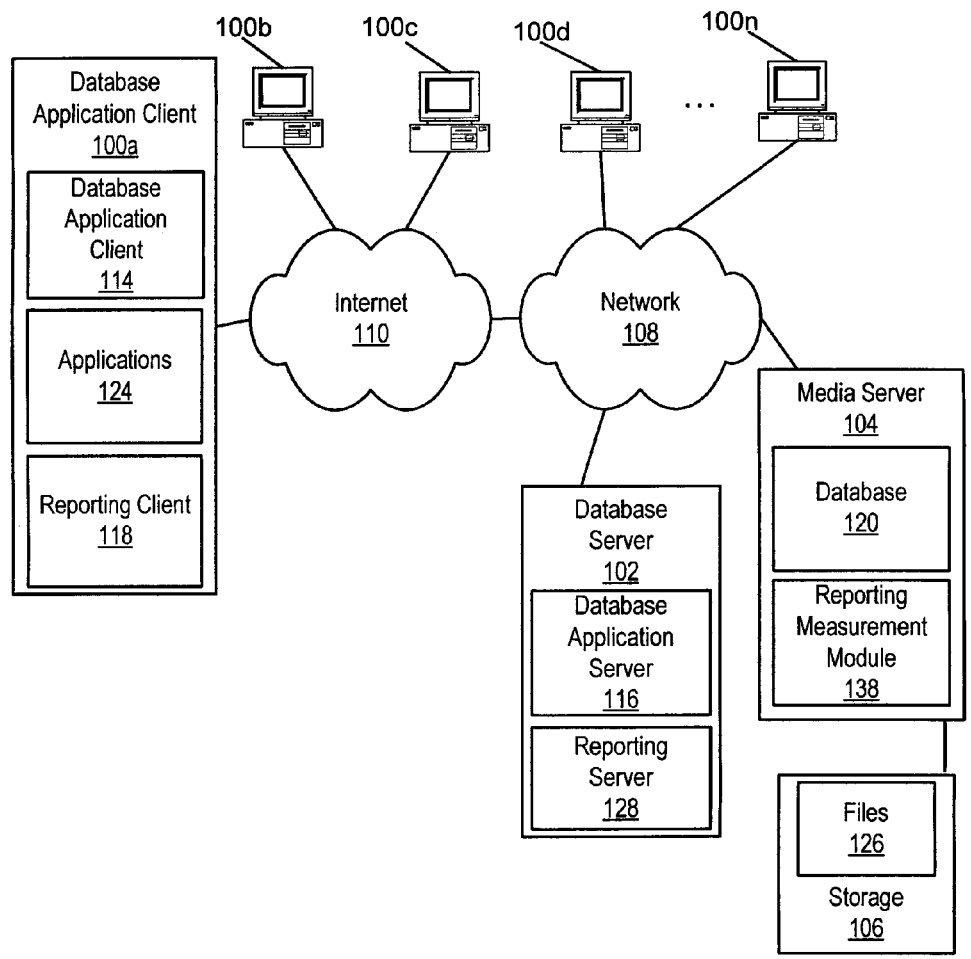
FIG. 1 illustrates a block diagram of a system for estimating report generation time according to one embodiment.

While the method, system and computer program product for estimating report generation time are susceptible to various modifications and alternative forms, specific embodiments are provided as examples in the drawings and detailed description. It should be understood that the drawings and detailed description are not intended to limit the present method, system and computer program product for estimating report generation time to the particular form disclosed. Instead, the intention is to cover all modifications, equivalents and alternatives falling within the spirit and scope of the present method, system and computer program product for estimating report generation time as defined by the appended claims.

DETAILED DESCRIPTION

A method, apparatus and computer-readable medium embodying various techniques for estimating report generation times are disclosed. In one embodiment, when a user of a database application client requests a report from a database application server, an estimate of the time to complete the report is made and a mode of delivery is suggested from a list of delivery options. The report generation time estimate can be based on the complexity of the report requested, the complexity of the database from which the report is generated by the database application server and utilization of (e.g., the user load or number of clients connected to) the database application server. In some embodiments, size of a report or a database may be substituted or used as a proxy for complexity. In one embodiment, a model of the estimated time can be derived from simulated reports.

FIG. 1 illustrates a block diagram of a system for estimating report generation time. In one embodiment, the components in FIG. 1 can provide access to and modifications of a database, as well as reports on data contained in a database as part of a full-featured software suite. In alternative embodiments, the components of FIG. 1 will be used exclusively for reporting and estimation of report generation time. FIG. 1 includes clients $100a$-$100n$, a database server 102, and a media server 104.

Clients $100d$-$100n$, database server 102 and media server 104 are coupled by a network 108, while clients $100a$-$100c$ connect to network 108 through Internet 110. While specific detail of an embodiment is shown for client $100a$, clients $100b$-$100n$ are also capable of being similarly configured or configured for alternative embodiments for simultaneous use. In some embodiments, client $100a$ can also connect directly to network 108. However, in the example depicted in FIG. 1, client $100a$ is instead coupled to network 108 by Internet 110. Thus, client $100a$ can communicate with database server 102 and media server 104 even though client $100a$ does not have direct access to network 108. Such communication can, for instance, be conducted using a variety of techniques ranging from File Transfer Protocol (FTP) and HyperText Transfer Protocol (HTTP) to email and instant messaging.

Network 108 can include one or more WANs (Wide Area Networks), LANs (Local Area Networks), and/or one or more SANs (Storage Area Networks). Network 108 can be implemented using various media, including coaxial cables, fiber optic cables, and wireless links. One embodiment of network 108 presents a secure network that allows various computing devices to communicate with each other and share a database application that includes database server 102. Network 108 may implement various security techniques, such as firewall techniques.

Database server 102 hosts a database application server 116, which allows a database application client 114 on client $100a$ to access and modify data associated with a database 120 on media server 104. Database server 102 further hosts a reporting server 128. In one embodiment, reporting server 128 provides data to reporting client 118 for the estimation of report generation time. In alternative embodiments, reporting server 128 calculates an estimated report generation time and provides the estimated report generation time to reporting client 118. With respect to the preparation of reports themselves, in one embodiment, reporting server 128 prepares reports for delivery to, for example, reporting client 118. In alternative embodiments, reporting server 128 prepares reports for delivery via email or to a printer associated with one of clients 100a-100n. In another alternative embodiment, reporting server 128 prepares information for delivery to reporting client 118, from which reports are prepared by reporting client 118. Reporting server 128 may then optionally request information from reporting measurement module 138, such as the database complexity value indicating the total size of database 120 associated with the report.

Media server 104 hosts database 120 and reporting module 138. Much of the data associated with database 120 is stored as files 126 on storage 106. In an alternative embodiment, database 120 is stored as objects rather than files 126. In one embodiment, storage 106 is implemented as a fixed disk drive. Likewise, alternative embodiments may use various forms of storage, such as Random Access Memory (RAM) or flash memory in place of a fixed disk drive for the implementation of storage 106.

Client 100a hosts database application client 114 and includes applications such as an email client (not shown) and a reporting client 118. In one embodiment, reporting client 118 is a web page (or a browser window that displays a web page) that supports the preparation or request and delivery of reports from data associated with database 120 through interaction with reporting server 128. Further, reporting client 118 contains embedded calculation logic and data that provides estimates of time necessary to complete reports through interaction with reporting server 128.

In one embodiment, a user of database application client 114 requests a report through use of reporting client 118. Reporting client 118 then queries reporting server 128 for information that is not locally available and is useful in estimating a report generation time. The information requested can vary between embodiments. In one embodiment, the information requested includes a report definition specifying parameters needed to generate the report, which is used in determining a report complexity value indicating a total number of entries for the report or, alternatively, a total number of calculations needed to generate the report. Similarly, the information requested may include a database application utilization value indicating a number of sessions being processed by database application server 116. The information requested may also include a database complexity value indicating a total size of database 120 associated with the report.

Upon generating or receiving requested information, reporting server 128 answers the query sent by reporting client 118. Reporting client 118 then calculates an estimated report generation time and suggests to a user of database application client 114 a mode of delivery appropriate for the estimated delivery time. In developing estimates of report completion time, some data supplied to reporting client 118 from reporting server 128 can be received from and generated by reporting measurement module 138. In one embodiment, the suggested mode of delivery is configurable by a user of database application client 114 using a set of configurable rules stored by reporting client 118. Configurable rules governing the behavior of reporting client 118 can be pre-configured at delivery (e.g., installation of software on a client system) of reporting client 118. Configurable rules may be subsequently adjusted to conform to user preference through a user interface for reporting client 118. For instance, in an embodiment in which an email client is available among applications 124, a configurable rule instructs database application client 114 or reporting client 118 to recommend delivery via email of any report expected to take more than eight hours to generate. In one embodiment, a configurable rule may also recommend routing of a report to a printer (not shown) connected to client 100a. In one embodiment, a configurable rule may also recommend routing a report with an expected report generation time of less than one minute directly to reporting client 118 for display. In one embodiment, configurable rules will specify default settings, based on estimates of report preparation time, for the delivery of reports, and recommendations resulting from configurable rules can be overridden by the user. In some alternative embodiments, however, some rules will not be subject to user override or will require administrator privileges for override.

In some alternative embodiments, all or part of reporting client 118 will be embodied as a component of database application client 114, reporting server 128 will be embodied as a component of database application server 116 and/or reporting measurement module 138 will be embodied as a component of database 120. For example, in one alternative embodiment, calculation of an estimate of report delivery time may be performed by reporting server 128 while recommendations for a suggested delivery mode are generated by reporting client 118 based on the estimate and a configurable rule (as described above).

Figure 2:
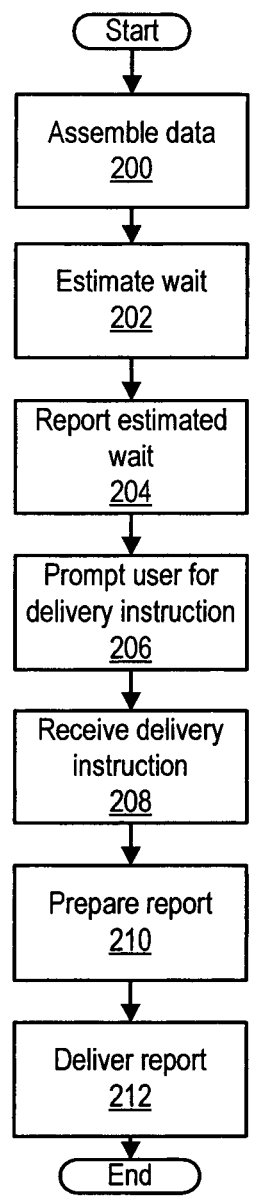
FIG. 2 is a flowchart of a method for estimating report generation time according to one embodiment.

FIG. 2 is a flowchart of a method for estimating report generation. The process starts at operation 200, which depicts assembling data necessary to generate an estimate of report generation time (wait time). In one embodiment, assembling data necessary to generate an estimate of report generation time is performed by, for example, reporting client 118 through interaction with reporting server 128.

Operation 202 illustrates estimating, based on the data received in operation 200, a wait time associated with the generation of the requested report. In one embodiment, estimating wait time associated with the generation of the requested report is performed by reporting client 118. In an alternative embodiment, estimating wait time associated with the generation of the requested report is performed by reporting server 128, which then sends the estimated report generation time to reporting client 118.

The process then proceeds to operation 204, which depicts reporting the wait estimated in operation 202 to a user of client 100a. In one embodiment, reporting the wait estimated in operation 202 is performed by reporting client 118. Reporting of the estimated wait time can include display of a web page containing an embedded item of code for report calculation. In one exemplary embodiment, when the web page is rendered for display to a user, the embedded item of code calculates an estimated report delivery time, which is also displayed to the user as part of the web page.

Operation 206 illustrates prompting the user for a delivery instruction. In one embodiment, prompting the user for a delivery instruction is accomplished by reporting client 118 displaying a set of delivery options (for example, as text identifying "delivery to printer" or delivery to email" or as icons in the shape of a printer and an envelope, respectively). A preferred choice is selected and displayed (for instance, highlighted or shown with a checkmark for a default option) on the basis of the estimated amount of time.

The process then proceeds to operation 208, which depicts receiving a delivery instruction from the user. The delivery instruction identifies a delivery mode, such as "delivery to printer". In one embodiment, reporting client 118 receives the instruction from the user and sends the instruction to reporting server 128.

Operation 210 illustrates preparing the report requested by the user. In one embodiment, preparing the report includes reporting client 118 sending a request for report preparation to reporting server 128, in response to which reporting server 128 generates the requested report and returns the report to reporting client 118. In another embodiment, preparing the report includes generating the report on reporting client 118.

The process next moves to operation 212, which depicts delivering the report prepared in operation 210 according to the method of delivery specified in operation 208. In one embodiment, delivering the report prepared in operation 210 includes reporting server 128 emailing the report to a specified email address. In another embodiment, delivering the report prepared in operation 210 includes reporting server 128 publishing the report to a specified world wide web address. In yet another embodiment, delivering the report prepared in operation 210 includes reporting client 118 displaying the report in a display window on client 100a. Many other delivery options, such as sending to a printer or storing to a particular directory, may be available in alternative embodiments. The process then ends.

Figure 3:
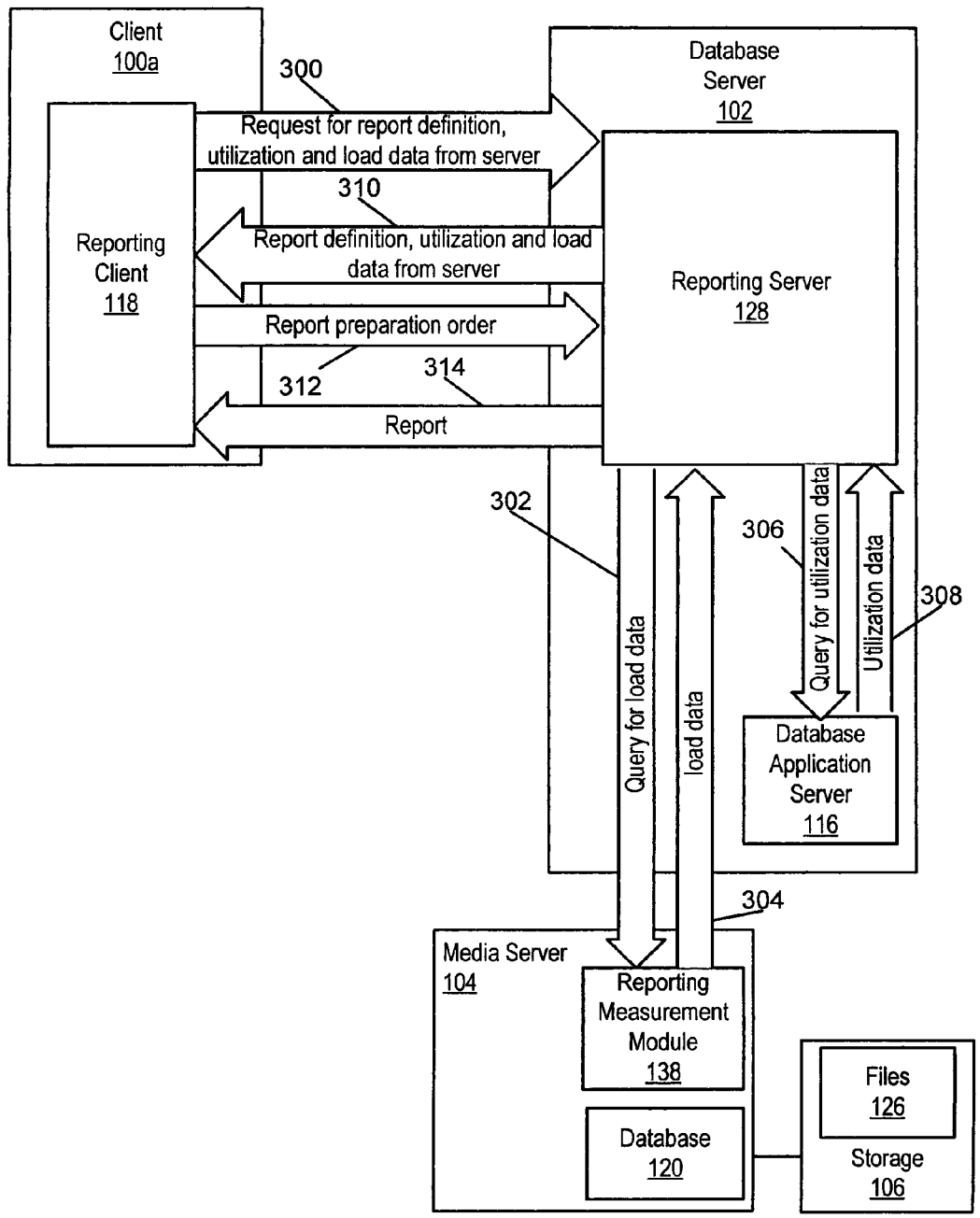
FIG. 3 depicts a message flow diagram representing data flows supporting a method for estimating report generation time according to one embodiment.

FIG. 3 depicts a message flow diagram representing data flows for estimating report generation time according to one embodiment. When a user of client 100a requests a report, reporting client 118 on client 100a sends a request for a report definition, utilization and load data from server (hereafter request 300) to reporting server 128. The requested report definition specifies parameters needed to generate the report, which are used in determining a report complexity value indicating a total number of entries for the report, while the requested database application utilization value indicates a number of sessions being processed by database application server 116 and the requested load data includes a database complexity value indicating a total size of database 120 associated with the report.

Reporting server 128 on database server 102 responds to request 300 by sending a query for load data (hereafter query 302) to reporting measurement module 138 on media server 104. Reporting measurement module 138 responds to query 302 by sending load data 304 to reporting server 128. Load data 304 includes a database complexity value indicating a total size of database 120, which may indicate a total number of entries, a total number of fields, a total number of data bytes, or any other indicator of complexity. In some embodiments, where database application server 116 is not the only program accessing database 120, load data 304 will also include resource demand information representing the extent of resource demand provided by applications other than database application server 116. Load data 304 can also include information representing latency and demand related to access to files 126 on storage 106.

Reporting server 128 on database server 102 also responds to request 300 by sending a query for utilization data (hereafter query 306) to database application server 116 on database server 102. The order of presentation of query 302 and query 306 with respect to FIG. 3 is not intended to imply any particular order of transmission in actual embodiments. Query 302 and query 306 may be transmitted in any order or in parallel. Database application server 116 responds to query 306 by sending utilization data 308 to reporting server 128. Utilization data 308 indicates a number of sessions being processed by database application server 116. While FIG. 3 includes query 302 and query 306 sent in response to request 300, an alternative embodiment such as that depicted with respect FIG. 4B, below, may perform periodic queries to obtain and store the data represented by query 302 and query 306. For example, periodic queries may be similar in function to query 302 and query 306 and may be sent by reporting server 128 but may be performed in response to expiration of a time interval.

In one embodiment, reporting server 128, after receipt of utilization data 308 and load data 304, sends report definition, utilization and load data from server (hereafter response 310) to reporting client 118. Reporting client 118 estimates report generation time from response 310. In one embodiment, after an estimated report generation time is presented to the user and the user has approved both report parameters and a proposed delivery method, reporting client 118 sends report preparation order 312 to reporting server 128. In the embodiment depicted in FIG. 3, reporting server 128 then generates the requested report and delivers the report 314 using the delivery method specified in report execution order 312. Alternatively, in some embodiments, reporting client 118 may request raw data from reporting server 128 and prepare a report locally.

Many of the operations illustrated in FIG. 3 can be performed by modules other than those demonstrated in FIG. 3. Further, that some of the operations and components illustrated in FIG. 3 may be omitted, and other operations and components may be added or substituted. For example, in some embodiments, reporting client 118 can directly query reporting measurement module 138 for load data 304 and can directly query database application server 116 for utilization data 308, thereby eliminating the need for involvement of reporting server 128 in estimation of report generation time.

Figure 4A:
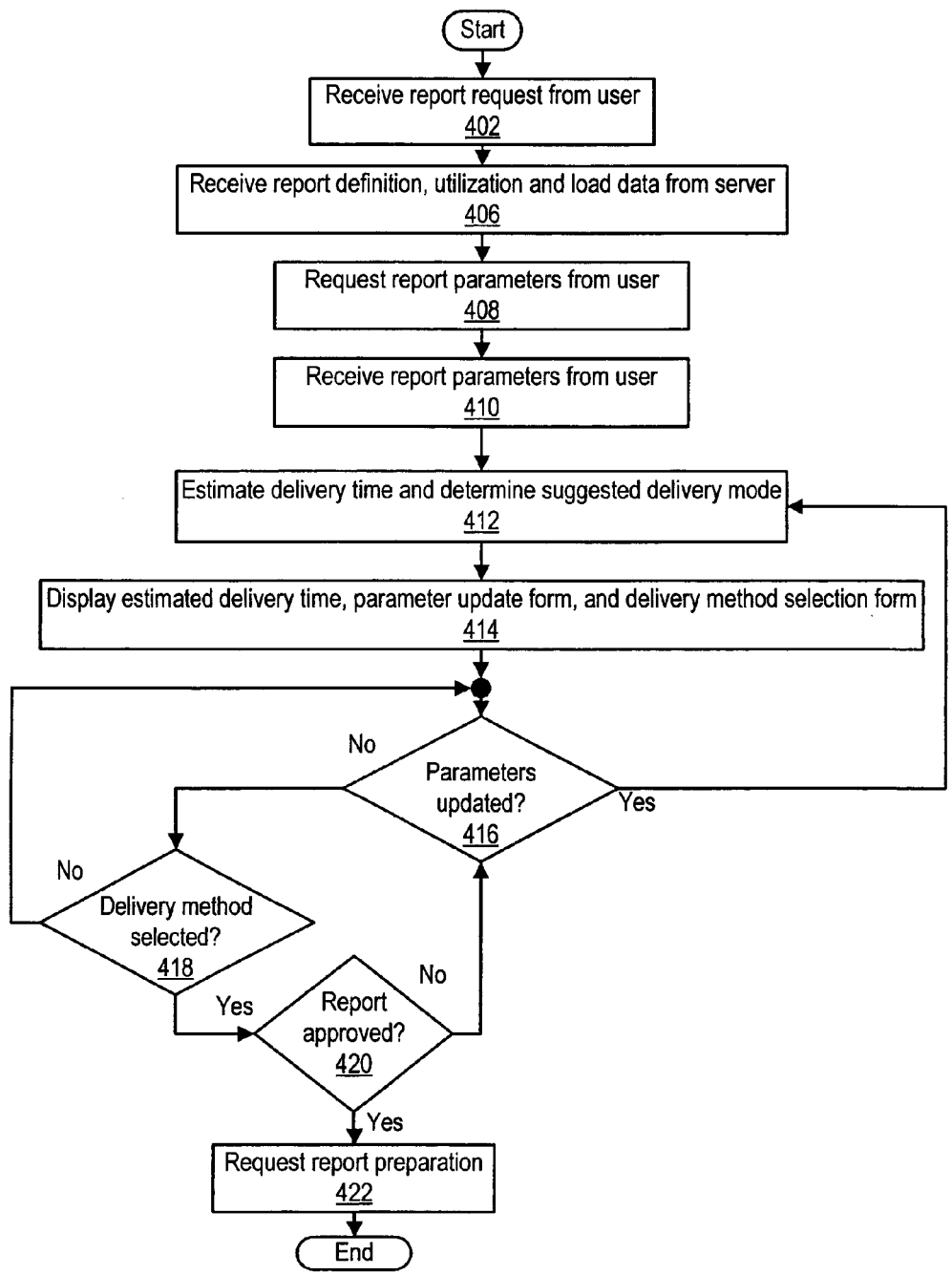
FIG. 4A is a flowchart of a procedure for providing reports using a method for estimating report generation time according to one embodiment.

FIG. 4A is a flowchart of one embodiment of a procedure for providing reports using a method for estimating report generation time. The process starts at operation 402, which depicts reporting client 118 receiving a report request from a user of client 100a. In one embodiment, the request for a report is received through a user interface embodied as a web page. Operation 406 illustrates reporting client 118 receiving response 310. The process then proceeds to operation 408, which depicts reporting client 118 requesting parameters from a user of client 100a.

Operation 410 illustrates reporting client 118 receiving report parameters from the user of client 100a. The parameters received in operation 410 define the complexity and size of the report requested in operation 402. The process then proceeds to operation 412, which illustrates reporting client 118 estimating a report delivery time and determining a suggested delivery mode. Operation 414 illustrates reporting client 118 displaying an estimated delivery time, a parameter update form and a delivery method selection form. A delivery method selection form may be embodied as a web page with a pulldown menu or a other user interface. Similarly, a parameter update form can be embodied as a web page with pre-filled blanks and check boxes.

A user may choose to update parameters in response to seeing an estimated report generation time. For instance, a user who needs a quick estimate of the number of orders received by a business in the last week might remove order details from a requested report in order to shorten delivery time. The parameter update form allows the user of client 100a to adjust parameters of the report. In one embodiment, a delivery method selection form includes a set of delivery options, with one of the options displayed as a preferred option on the basis of the estimated delivery time.

The process then proceeds to operation 416, which depicts reporting client 118 determining whether the parameters in the parameter update form displayed in operation 414 have been updated. If reporting client 118 determines that the parameters in the parameter update form displayed in operation 414 have been updated, then the process returns to operation 412, which is described above. By contrast, if reporting client 118 determines that the parameters in the parameter update form displayed in operation 414 have not been updated, then the process next moves to operation 418.

Operation 418 illustrates reporting client 118 determining whether a delivery mode has been selected. A delivery mode can be selected by a user clicking an icon for a selected delivery option or pressing 'accept' while a suggested delivery option is highlighted. If reporting client 118 determines that a delivery mode has not been selected, then the process returns to operation 416, which is described above.

If reporting client 118 determines that a delivery mode has been selected, then the process next proceeds to operation 420, which depicts reporting client 118 determining whether the user has approved delivery of the report according to the displayed parameters and selected delivery method. In one embodiment, approval may be indicated by selecting a submit button or pressing the enter key while graphical user interface displaying parameters and delivery options. If reporting client 118 determines that the user has not approved delivery of the report according to the displayed parameters and delivery method, then the process returns to operation 416, which is described above. In an alternative embodiment, step 418 can be omitted if a user approves a report and a suggested method of delivery is not altered. If reporting client 118 determines that the user has approved delivery of the report according to the displayed parameters and delivery method, then the process proceeds to operation 422. Operation 422 illustrates reporting client 118 requesting delivery of the report according to the displayed parameters and delivery method by sending report execution order 312. The process then ends.

Figure 4B:
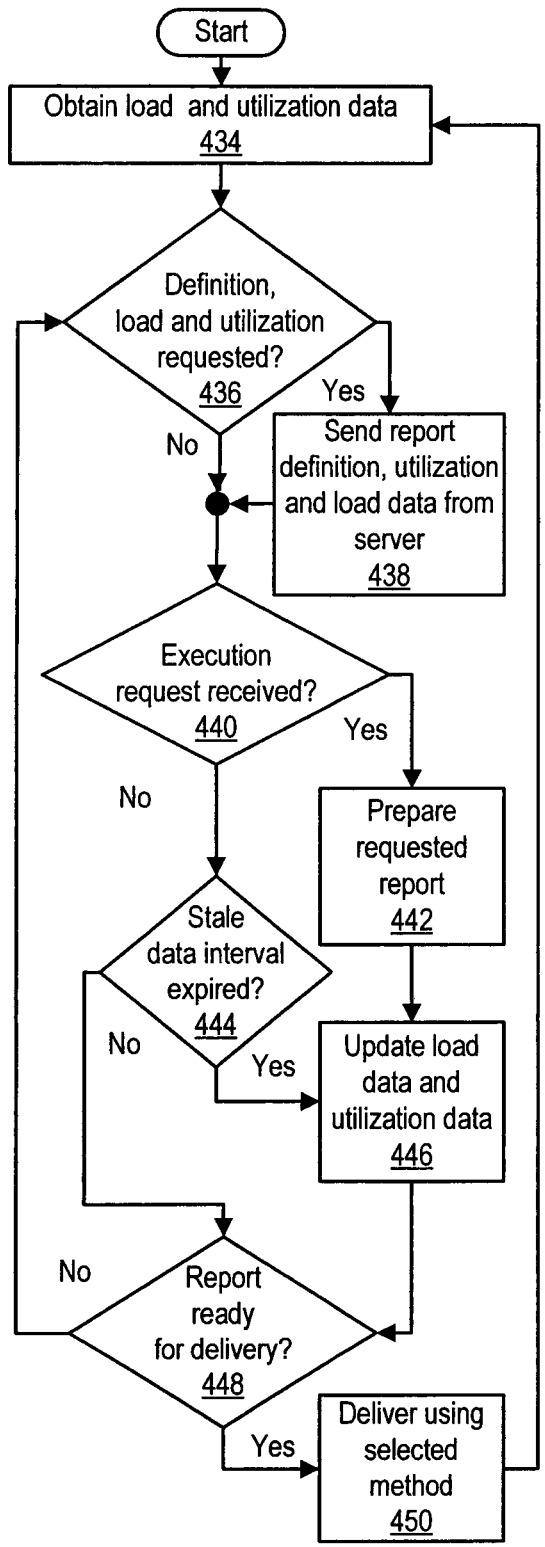
FIG. 4B is a flowchart of a procedure for preparing reports and supporting estimation of report generation time according to one embodiment.

FIG. 4B is a flowchart of one embodiment of a procedure for preparing reports and supporting estimation of report generation time according to one embodiment. The embodiment illustrated with respect to FIG. 4B supports parallel processing of multiple report requests and multiple report generation time estimates. The process starts at operation 434, which depicts reporting server 128 of FIG. 1 obtaining load and utilization data (e.g., by sending messages similar in purpose to query 302 and query 306 of FIG. 3). Operation 436 illustrates reporting server determining whether a request for report definition, utilization and load data (similar to request 300 of FIG. 3) has been received. If reporting server 128 determines that a request for report definition, utilization and load data has not been received, the process then proceeds to operation 440, which is described below. If reporting server 128 determines that a request for report definition, utilization and load data has been received, the process then proceeds to operation 438, which depicts reporting server 128 sending report definition, utilization and load data (similar to report definition, utilization and load data from server 310 of FIG. 3).

The process then proceeds to operation 440, which depicts reporting server 128 determining whether a request for report execution (similar to report execution order 312) has been received. If reporting server 128 determines that a request for report execution has not been received, the process then proceeds to operation 444, which is described below. If reporting server 128 determines that a request for report execution has been received, the process then proceeds to operation 442, which depicts reporting server 128 preparing the requested report. Operation 446 illustrates reporting server 128 updating load and utilization data (e.g., by sending messages similar in purpose to query 302 and query 306). This update will, among other things, indicate utilization created by the report just requested and by any additional requests from clients 100a-100n received since the last request for utilization data and load data.

The process then proceeds to operation 448. Operation 448 illustrates reporting server 128 determining whether a report, such as the report executed in operation 442, is ready for delivery. If reporting server 128 determines that a report is ready for delivery, then the process proceeds to operation 450, which depicts reporting server 128 delivering the report determined in operation 448 to be ready for delivery (e.g., report 312). The process then returns to operation 434, which is described above. Returning to operation 448, if reporting server 128 determines that a report is not ready for delivery, then the process returns to operation 436, which is described above.

Returning to operation 440, if reporting server 128 determines that a request for report execution has not been received, the process then proceeds to operation 444. Operation 444 illustrates reporting server 128 determining whether a stale data interval has elapsed. A stale data interval is a configurable length of time, such as ten minutes, which represents the amount of time that information is expected to remain current. If reporting server 128 determines that a stale data interval has elapsed, then the process proceeds to operation 446, which is described above. If reporting server 128 determines that a stale data interval has not elapsed, then the process proceeds to operation 448, which is described above.

Figure 4C:
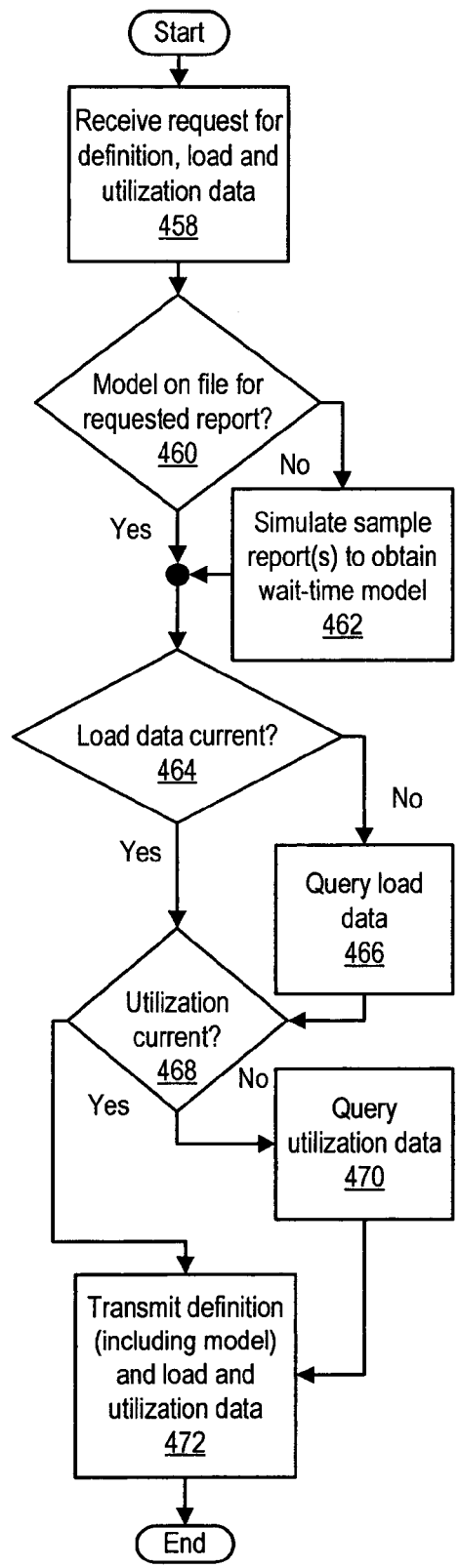
FIG. 4C is a flowchart of a procedure for obtaining data and modeling information in support of estimation of report preparation time according to one embodiment.

FIG. 4C is a flowchart of a procedure for obtaining data and modeling information in support of estimation of report preparation time according to one embodiment. While the embodiment depicted in FIG. 4C indicates the performance of various operations as part of a single linear process, alternative embodiments will allow for performance of the same operations asynchronously as objects executing separately and independently. The process begins at operation 458, which depicts reporting server 128 receiving a request for report definition, utilization and load data from server 300. Operation 460 illustrates reporting server 128 determining whether a model for estimating report generation time exists and is locally available for estimating the report generation time for the report requested. If reporting server 128 determines that a current model exists and is locally available, the process then proceeds to operation 464, which is described below.

If reporting server 128 determines that a current model does not exist or is not locally available, the process then proceeds to operation 462, which depicts reporting server 128 simulating sample reports to determine an accurate model of report generation (wait) time. For instance, a series of simulated reports can be run, which are tuned to enable reporting server 128 to ascertain the impact of various report parameters on report generation time. Simulations can, for instance, alter report parameters on a series of simulated runs of a particular type of report to ascertain the impact of any particular parameter. For instance, some reports involving the calculation of derived averages and spreads will take longer to calculate than reports involving only the production of data. Similarly, reports involving data from multiple databases will typically take longer to produce than reports involving a single database. By running a simulated report similar to a report requested by a user, reporting server 128 can develop a model that more accurately represents the conditions encountered in preparing a particular report.

In one embodiment, a model of report generation time is represented by the equation $t=Ax*By*Cz+Dq$, where t represents total report generation time. Such a model can be derived empirically from simulated reports, or can be supplied during creation or delivery of a software package. 'A' represents a correlation coefficient between the number of days covered by report (columns), represented by 'x', and the time needed to calculate the report. 'B' represents a correlation coefficient between the number of individual items reported for each day (rows), represented by 'y', and the time needed to calculate the report. 'C' represents a database application server delay coefficient correlating server utilization, represented by 'z', to length of time necessary to prepare a report. D represents a database delay coefficient correlating database load, represented by 'q', to length of time necessary to prepare a report.

Historical data can be used to update the value of each of A, B, C and D as new reports are calculated. When a report is prepared, the actual time necessary to prepare the report can be recorded and subsequently compared to simulations of the same report, and refinements of the model can be made.

The process then proceeds to operation 464, which depicts reporting server 128 determining whether current load data, representing a load on database 120, is available. If reporting server 128 determines that current load data is available, then the process proceeds to operation 468, which is described below. If reporting server 128 determines that current load data is not available, then the process next moves to operation 466. Operation 466 illustrates reporting server 128 querying load data by sending query 302 and receiving load data 304. The process then proceeds to operation 468, which depicts reporting server 128 determining whether current utilization data, representing the utilization of database application server 116, is available. If reporting server 128 determines that current utilization data is available, then the process proceeds to operation 472, which is described below. If reporting server 128 determines that current utilization data is not available, then the process next moves to operation 470. Operation 470 illustrates reporting server 128 querying utilization data by sending query 306 and receiving utilization data 308.

The process then proceeds to operation 472, which depicts reporting server 128 transmitting response 310 to reporting client 118. In one embodiment, the model referenced in operation 460 is included as part of a report definition. The process then ends.

Figure 5:
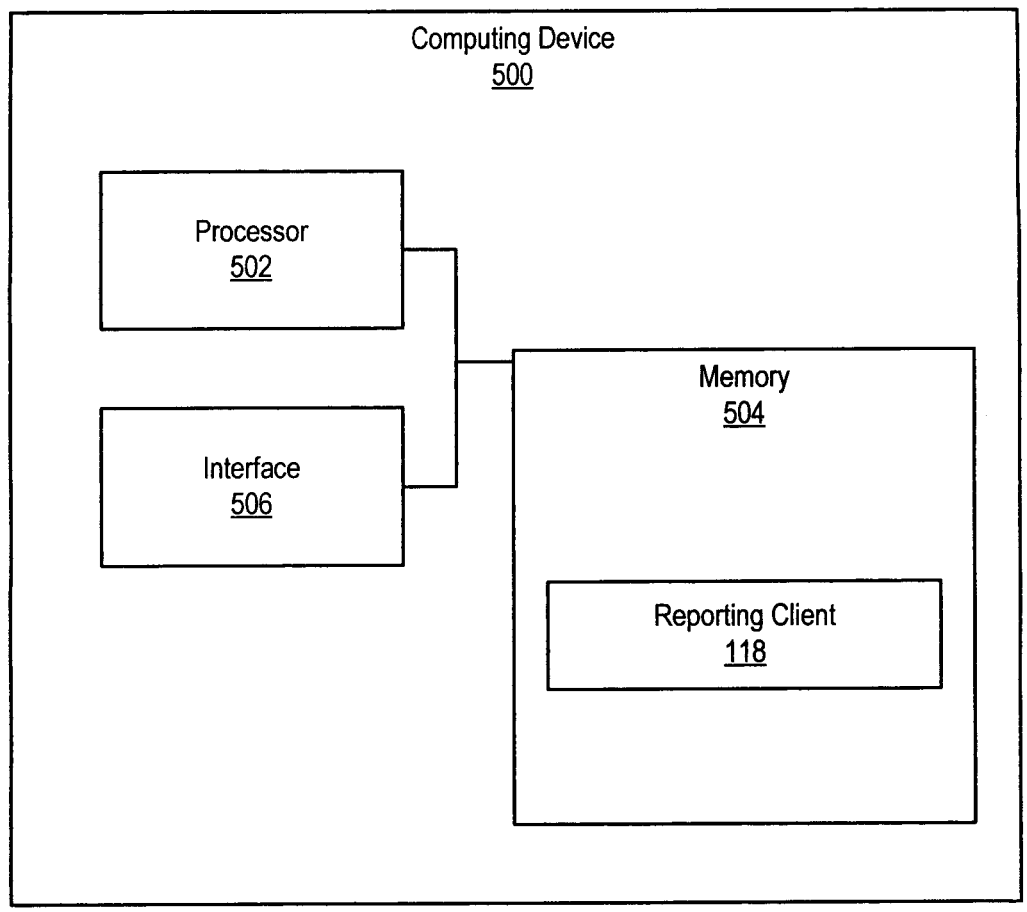
FIG. 5 depicts a block diagram of a computer system configured for performing estimation of report preparation time, according to one embodiment.

FIG. 5 depicts a block diagram of a computer system configured for performing estimation of report preparation time, which implements reporting client 118 (or, alternatively, reporting server 128 or reporting measurement module 138). Computing device 500 can implement client 100a, database server 102 or media server 104 of FIG. 1.

As illustrated, computing device 500 includes one or more processors 502 (e.g., microprocessors, PLDs (Programmable Logic Devices), or ASICs (Application Specific Integrated Circuits)) configured to execute program instructions stored on or in a computer-readable medium such as memory 504. Memory 504 can include various types of RAM (Random Access Memory), ROM (Read Only Memory), Flash memory, MEMS (Micro Electro-Mechanical Systems) memory, and the like. Computing device 500 also includes one or more interfaces 506. Processor 502, memory 504, and interface 506 are coupled to send and receive data and control signals by a bus or other interconnect.

Interface(s) 506 can include an interface to a storage device on which information, such as database 120, is stored. Interface(s) 506 can also include an interface to a network (e.g., network 108 or Internet 110 of FIG. 1) for use in communicating with a server (e.g., database server 102 of FIG. 1).

The program instructions and data implementing reporting client 118 can be stored on various computer readable storage media such as memory 504. In some embodiments, such software is stored on a computer readable storage medium such as a CD (Compact Disc), DVD (Digital Versatile Disc), hard disk, optical disk, tape device, floppy disk, and the like). In order be executed by processor 502, the instructions and data implementing reporting client 118 are loaded into memory 504 from the other computer readable medium. The instructions and/or data can also be transferred to computing device 500 for storage in memory 504 via a network such as the Internet or upon a carrier medium. In some embodiments, a network and/or a wireless link is used to convey signals such as electrical, electromagnetic, or digital signals, including data and instructions implementing reporting client 118.

Throughout the foregoing detailed description, where the numerical notation "n" is used in the present application, it is provided to indicate a number of objects, without necessarily specifying a consistent quantity between different instances of notation "n" or a correspondence between members of different groups labeled "n", though such correspondence or consistent quantity may exist in some embodiments.

Although the present method, system and computer program product for estimating report generation time have been described in connection with several embodiments, the method, system and computer program product for estimating report generation time are not intended to be limited to the specific forms set forth herein. On the contrary, it is intended to cover such alternatives, modifications, and equivalents as is reasonably included within the scope of the method, system and computer program product for estimating report generation time as defined by the appended claims.

What is claimed is:
1. A method, comprising:
receiving an indication that a user is requesting a report from a database application;
calculating an estimated amount of time for the database application to generate the report, wherein
the calculating comprises simulating a sample report,
the simulating comprises running at least one simulated run of the report,
the simulating comprises tuning one or more correlation coefficients,
the correlation coefficients comprise elements of a model of report generation time, and
the correlation coefficients correspond to at least one parameter of a set of parameters;
identifying a preferred choice delivery option from among a set of delivery options, wherein
the preferred choice delivery option is identified based upon the estimated amount of time, and
each delivery option of the set of delivery options specifies a respective medium of a plurality of mediums to make the report available to the user;
causing the estimated amount of time to be displayed to the user prior to initiating generation of the report;
detecting that, in response to the causing the estimated amount of time to be displayed, the user has updated, via a parameter update form, the at least one parameter of the set of parameters for the report, wherein a total number of entries in the report depends on the set of parameters, and the total number of entries in the report is greater than zero; and receiving information indicating a selected delivery option of the set of delivery options, subsequent to the causing, wherein the selected delivery option specifies which medium of the plurality of mediums will be used to make the report available to the user.

2. The method of claim 1, wherein the calculating further comprises:

calculating the estimated amount of time for the database application to generate the report on the basis of a database application utilization value indicating a number of sessions being processed by the database application, a report complexity value indicating a total number of entries for the report, and a database complexity value indicating a total size of a database associated with the report.

3. The method of claim 2, further comprising, obtaining a second utilization value for the database application in response to detecting a specified amount of time has elapsed since a prior obtaining of the utilization value.

4. The method of claim 2, further comprising, obtaining at least one of the database application utilization value and the database complexity value in response to receiving the indication that the user is requesting the report from the database application.

5. The method of claim 1, further comprising, generating a user interface comprising the set of delivery options; and displaying the preferred choice a delivery option from among the set of delivery options.

6. The method of claim 1, wherein the calculating further comprises:

calculating the estimated amount of time using a model based on the actual time used to simulate the sample report, wherein the model is updated based on historical data from previously running the report.

7. The method of claim 2, further comprising, receiving from the user the set of parameters for the report, wherein the set of parameters defines the size and complexity of the report, and the report complexity value is based on the set of parameters; and calculating the estimated amount of time based on the parameters.

8. The method of claim 1, further comprising:

receiving a command to initiate generation of the report, subsequent to the causing.

9. The method of claim 1, wherein the preferred delivery choice option is recommended according to a configurable rule, and the configurable rule is updated according to user preference.

10. The method of claim 6, further comprising:

determining effects on the estimated amount of time of altering the at least one parameter, wherein the correlation coefficients correspond to a number of days covered by the report, a number of items reported per day, a database server delay, and a database load.

11. An apparatus, said apparatus comprising:

a processor;

means for receiving an indication that a user is requesting a report from a database application;

means for identifying a preferred choice delivery option from among a set of delivery options, wherein the preferred choice delivery option is identified based upon the estimated amount of time, and each delivery option of the set of delivery options specifies a respective medium of a plurality of mediums to make the report available to the user;

means for calculating an estimated amount of time for the database application to generate the report, wherein the calculating comprises simulating a sample report, the simulating comprises running at least one simulated run of the report, the simulating comprises tuning one or more correlation coefficients, the correlation coefficients comprise elements of a model of report generation time, and the correlation coefficients correspond to at least one parameter of a set of parameters;

means for causing the estimated amount of time to be displayed to the user prior to initiating generation of the report;

means for detecting that, in response to causing the estimated amount of time to be displayed, the user has updated, via a parameter update form, the at least one parameter of the set of parameters for the report, wherein a total number of entries in the report depends on the set of parameters, and the total number of entries in the report is greater than zero; and means receiving information indicating a selected delivery option of the set of delivery options, subsequent to the causing, wherein the selected delivery option specifies which medium of the plurality of mediums will be used to make the report available to the user.

12. The apparatus of claim 11, wherein the means for calculating further comprises:

means for calculating the estimated amount of time for the database application to generate the report on the basis of a database application utilization value indicating a number of sessions being processed by the database application, a report complexity value indicating a total number of entries for the report, and a database complexity value indicating a total size of a database associated with the report.

13. The apparatus of claim 12, further comprising, means for causing the processor to obtain a second utilization value for the database application in response to detecting a specified amount of time has elapsed since a prior obtaining of the utilization value.

14. The apparatus of claim 12, further comprising, means for obtaining at least one of the database application utilization value and the database complexity value in response to receiving the indication that the user is requesting the report from the database application.

15. The apparatus of claim 11, further comprising, means for generating a user interface comprising the set of delivery options; and means for displaying the preferred choice a delivery option from among the set of delivery options.

16. The apparatus of claim 11, wherein the means for calculating further comprises:

means for calculating the estimated amount of time using a model based on the actual time used to simulate the sample report, wherein
the model is updated based on historical data from previously running the report.

17. The apparatus of claim 12, further comprising,
means for receiving from the user a set of parameters for the report, wherein
the set of parameters defines the size and complexity of the report, and
the report complexity value is based on the set of parameters; and
means for calculating the estimated amount of time based on the parameters.

18. A computer program product in a computer-readable storage medium, said computer program product comprising:
the computer-readable storage medium, storing instructions for
receiving an indication that a user is requesting a report from a database application;
calculating an estimated amount of time for the database application to generate the report;
identifying a preferred choice delivery option from among a set of delivery options, wherein
the preferred choice delivery option is identified based upon the estimated amount of time, and
each delivery option of the set of delivery options specifies a respective medium of a plurality of mediums to make the report available to the user;
causing the estimated amount of time to be displayed to the user prior to initiating generation of the report, wherein
the calculating comprises simulating a sample report,
the simulating comprises running at least one simulated run of the report,
the simulating comprises tuning one or more correlation coefficients,
the correlation coefficients comprise elements of a model of report generation time, and
the correlation coefficients correspond to at least one parameter of a set of parameters;
detecting that, in response to the causing the estimated amount of time to be displayed, the user has updated, via a parameter update form, the at least one parameter of the set of parameters for the report, wherein
a total number of entries in the report depends on the set of parameters, and
the total number of entries in the report is greater than zero; and
receiving information indicating a selected delivery option of the set of delivery options, subsequent to the causing, wherein
the selected delivery option specifies which medium of the plurality of mediums will be used to make the report available to the user.

19. The computer program product in a computer-readable storage medium of claim 18, wherein the calculating further comprise:
calculating the estimated amount of time for the database application to generate the report on the basis of a database application utilization value indicating a number of sessions being processed by the database application, a report complexity value indicating a total number of entries for the report, and a database complexity value indicating a total size of a database associated with the report.

20. The computer program product in a computer-readable storage medium of claim 19, further comprising,
instructions for obtaining a second utilization value for the database application in response to detecting a specified amount of time has elapsed since a prior obtaining of the utilization value.

21. The computer program product in a computer-readable storage medium of claim 19, further comprising,
instructions for obtaining at least one of the database application utilization value and the database complexity value in response to receiving the indication that the user is requesting the report from the database application.

22. The computer program product in a computer-readable storage medium of claim 18, further comprising,
instructions for generating a user interface comprising the set of delivery options; and
instructions for displaying the preferred choice a delivery option from among the set of delivery options.

23. The computer program product in a computer-readable storage medium of claim 18, wherein the instructions on the computer-readable medium for calculating further comprise:
instructions for calculating the estimated amount of time using a model based on the actual time used to simulate the sample report, wherein
the model is updated based on historical data from previously running the report.

* * * * *